United States Patent [19]
Ambs et al.

[11] Patent Number: 6,011,752
[45] Date of Patent: Jan. 4, 2000

[54] SEISMIC STREAMER POSITION CONTROL MODULE

[75] Inventors: Loran D. Ambs, Fulshear; Ronald E. Chambers, Houston, both of Tex.

[73] Assignee: Western Atlas International, Inc., Houston, Tex.

[21] Appl. No.: 09/128,336

[22] Filed: Aug. 3, 1998

[51] Int. Cl.[7] ................................................. G01V 1/00
[52] U.S. Cl. ........................... 367/17; 114/235; 114/244; 114/242
[58] Field of Search ........................ 367/61, 17; 181/110; 340/7; 114/235, 244, 242

[56] References Cited

U.S. PATENT DOCUMENTS

| | | | |
|---|---|---|---|
| 3,943,483 | 3/1976 | Strange | 114/235 |
| 4,694,435 | 9/1987 | Magnesville | 367/17 |
| 5,443,027 | 8/1995 | Owsley et al. | 114/244 |

*Primary Examiner*—Christine K. Oda
*Assistant Examiner*—Anthony Jolly

[57] ABSTRACT

A seismic streamer position control module has been invented having a body with a first end and a second end and a bore therethrough from the first end to the second end for receiving a seismic streamer therethrough, at least one control surface, and at least one recess in which is initially disposed the at least one control surface, the at least one control surface movably connected to the body for movement from and into the at least one recess and for movement, when extended from the body, for attitude adjustment. In one aspect the seismic streamer position control module body has tapered ends.

20 Claims, 5 Drawing Sheets

SEISMIC STREAMER POSITION CONTROL MODULE

BACKGROUND OF THE INVENTION

1. Field of the Invention

This invention is directed to seismic streamers; to seismic streamer depth control devices; to methods of their use; and to methods of their storage and deployment.

2. Description of Related Art

The prior art discloses a wide variety of depth control devices for seismic streamers, some of which are referred to as "birds." Typically, a bird is suspended from a streamer from a slip ring attached to the streamer and is releasably connected thereby to the streamer as it is deployed and removed from the streamer as it is recovered. To control streamer depth, certain prior art systems use one bird for every thousand feet of streamer or for every three "sections."

Currents, wind, and wave action deflect the streamer cables from their intended paths, and streamer cable drift is a continuing problem for marine seismic surveys. See, for example, U.S. Pat. No. 5,532,975. By controlling the position and shape of the streamer cables entanglement of the streamer cables is avoided and collisions with offshore hazards such as marine drilling rigs and production platforms are prevented. Since known 3-D seismic binning processes acquire subsurface seismic coverage by combining seismic data from seismic streamers at different locations, it is desirable to have the ability to control the position and shape of the streamer cables during marine 3-D seismic surveys. The need for this ability is taught by Franklyn K. Levin in "Short Note: The effect of binning on data from a feathered streamer,"Geophysics, Vol. 49. No. 8, pp. 1386–1387.

A variety of streamer positioning devices are well known in the art. Apparatus, such as those disclosed in U.S. Pat. Nos. 5,532,975, 4,729,333, and 4,463,701 are attached to streamer cables to maintain them at a lateral offset to the pathway of a towing vessel. U.S. Pat. No. 4,890,568 describes steerable tail buoys for controlling the position of the tail end of towed seismic streamer cables. Streamer positioning devices that are attached externally to the streamer cables to control lateral positioning by using camber-adjustable hydrofoils or angled wings are disclosed in U.S. Pat. Nos. 4,033,278 and 5,443,027. U.S. Pat. No. 3,931,608 discloses a bird for controlling the vertical positioning of streamer cables with diving planes and a preset depth control apparatus.

The prior art discloses a variety of location sensing devices and methods for determining the positions of seismic sources and seismic streamer cables. A Global Positioning System, described in U.S. Pat. No. 4,809,005 and a network of acoustic elements described in U.S. Pat. No. 4,912,682 may be deployed on a vessel, streamer cables, and tail buoy and may then be used to determine the real-time position of seismic sources and seismic streamer cables by computing a network solution with a Kalman filter, e.g. as disclosed by U.S. Pat. No. 5,353,223.

In known prior art methods of marine seismic surveying, a human operator monitors the survey's operational conditions, such as the extent of subsurface seismic coverage, the adequacy of separations between streamer cables, and the proximity of streamer cables to obstructive hazards. When these conditions indicate the need to reposition the streamer cables, the operator may manually issue commands to various individual streamer positioning devices in order to adjust the position and shape of the streamer cable, or order a vessel's helmsman to redirect the vessel, or suspend data acquisition.

In certain prior art systems, a bird is about four feet long and is powered by multiple D-size batteries. Rechargeable batteries have been employed in some birds to extend the life of the batteries. Electric power in some devices is inefficiently transmitted to the bird via electromagnetic induction coils beneath the skin of the streamer and a coil in the bird. These birds must be removed from a streamer as it is retrieved and secured to the streamer as it is deployed. Communication between the ship-board streamer controller and the birds is accomplished via signals communicated at relative low data rates across the skin of the streamer by indirect means of one or more electromagnetic coils beneath the skin of the streamer and another coil within the bird structure. Elaborate mechanical schemes have been devised to assure communications as the streamer cable rotates relative to the bird.

There has long been a need for an easily deployable and retrievable seismic streamer whose depth can be controlled. There has long been a need for such a streamer with effective and efficient depth control devices. There has long been a need for a seismic streamer depth control device whose power is effectively and efficiently obtained from a streamer power distribution system. There has long been a need for a simple way to communicate directly with a bird's control and sensor electronics. There has long been a need for a bird device which is also capable of producing vertical, non-vertical, and horizontal forces which facilitate vertical and horizontal movement of the streamer cable. There has long been a need, recognized by the present inventors, for relatively compact bird devices that do not interfere with streamer deployment and retrieval operations and which, in certain aspects, remain on a streamer in storage.

SUMMARY OF THE PRESENT INVENTION

The present invention, in certain aspects, discloses a marine seismic streamer having one or more position control devices or "birds" therein or thereon which do not hang from the streamer but are secured therearound or thereto, or are applied on streamer section connectors. In one aspect, such a streamer has one or more position control modules which are co-axially attached to an exterior of a streamer section coupling module. Such position control modules, in certain embodiments, have a streamlined and relatively small profile projecting outwardly from the streamer's exterior surface thereby making it possible to retrieve the streamer with the depth control modules in place thereon. The modules are retrieved onto a reel with the streamer, i.e., there is no necessity to remove them during streamer retrieval. Also, there is, therefore, no necessity to attach them to the streamer as it is being deployed. The streamlined profile also inhibits tangling of the streamer with another streamer, with fishing lines and nets, etc.

In one aspect the position control modules or "birds" have a body and one, two, three, four or more control surfaces initially disposed in recesses in the body. The control surfaces are selectively movable from the body to contact the water in which the streamer is deployed to effect a change in depth and/or lateral position of the streamer and to maintain the streamer at a desired location relative to a tow vessel. In one aspect the bird is fixedly attached around the streamer, and rotates or twists as the streamer rotates or twists. In another aspect, the bird is loosely positioned around streamer and aligns itself to the gravity normal by gravity and/or by mechanical means.

In one aspect each depth control module has one or more internal accelerometers to sense and indicate direction of a gravity vector. Commands generated by a tow vessel may instruct the bird to change streamer depth and/or lateral position. This is accomplished, in certain preferred embodiments, by fuzzy or proportional control algorithms within a bird microprocessor. The purpose of the microprocessor is to adjust bird "wing" angles to achieve a desired change in position given the configuration of the "swings" on the bird and the relative orientation of the bird with respect to the gravity vector. Commands are communicated between the streamer control system on-board the tow vessel and the bird along wires or fiber-optic channels within the streamer. Status of the bird health and activity may also be communicated on such channels back to the tow-vessel. Certain particular bird control methods and systems are disclosed in pending U.S. application Ser. No. 08/771,049 filed on Dec. 20, 1996, co-owned with the present invention, and incorporated fully herein for all purposes.

In one aspect the control surfaces are releasable from an extended position in response to contact with an obstruction. In one embodiment, control surfaces of a bird are flexibly attached to a streamer by a spring or springs of sufficient stiffness to prevent the axis of the "wing" from bending under normal hydrodynamic loading. In the event that the "owing" comes into contact with foreign objects (e.g. but not limited to another streamer, fish pot buoy lines, fishing lines, etc.) the spring(s) allow the "wing" to be deflected and thereby prevent or minimize damage to the bird and reduce the risk of entanglement with foreign objects.

In one embodiment the control modules are incorporated into a streamer section rather than secured around it. In one aspect the control modules are disposed in streamer connection modules that connect two streamer sections. Position control devices disposed in these ways may include power and/or signal transmission apparatus for conveying power and/or signals between streamer sections.

In one embodiment, the wings of a bird are opened and closed in a plane parallel to the diameter of a control module. Wings may be housed on or in a streamer-position-module.

In another embodiment, the wings of a bird are opened and closed in a plane perpendicular to the diameter of the control module. In one such embodiment, two short wings are deployed at right angles to a larger wing which produces comparable lift for the same angle-of-attack of the two smaller wings.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious seismic streamers and such streamers with one or more position control devices thereon or therein;

Such a seismic streamer with position control device(s) with a streamlined profile so that the streamer with the device(s) thereon and/or therein may be easily retrieved on a reel and deployed from a reel;

Such a position control device with at least one or a plurality of selectively movable angle-of-attack control surface which is/are positioned within a recess in a body of the module and movable outwardly therefrom;

Such a streamer with such position control modules which is less likely to entangle with another streamer or other object;

Such a streamer with position control modules spaced-apart a relatively short distance for greater control of streamer depth; and New, useful, unique, efficient and nonobvious methods for using such streamers.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figures 1, 2, 3A, 3B:
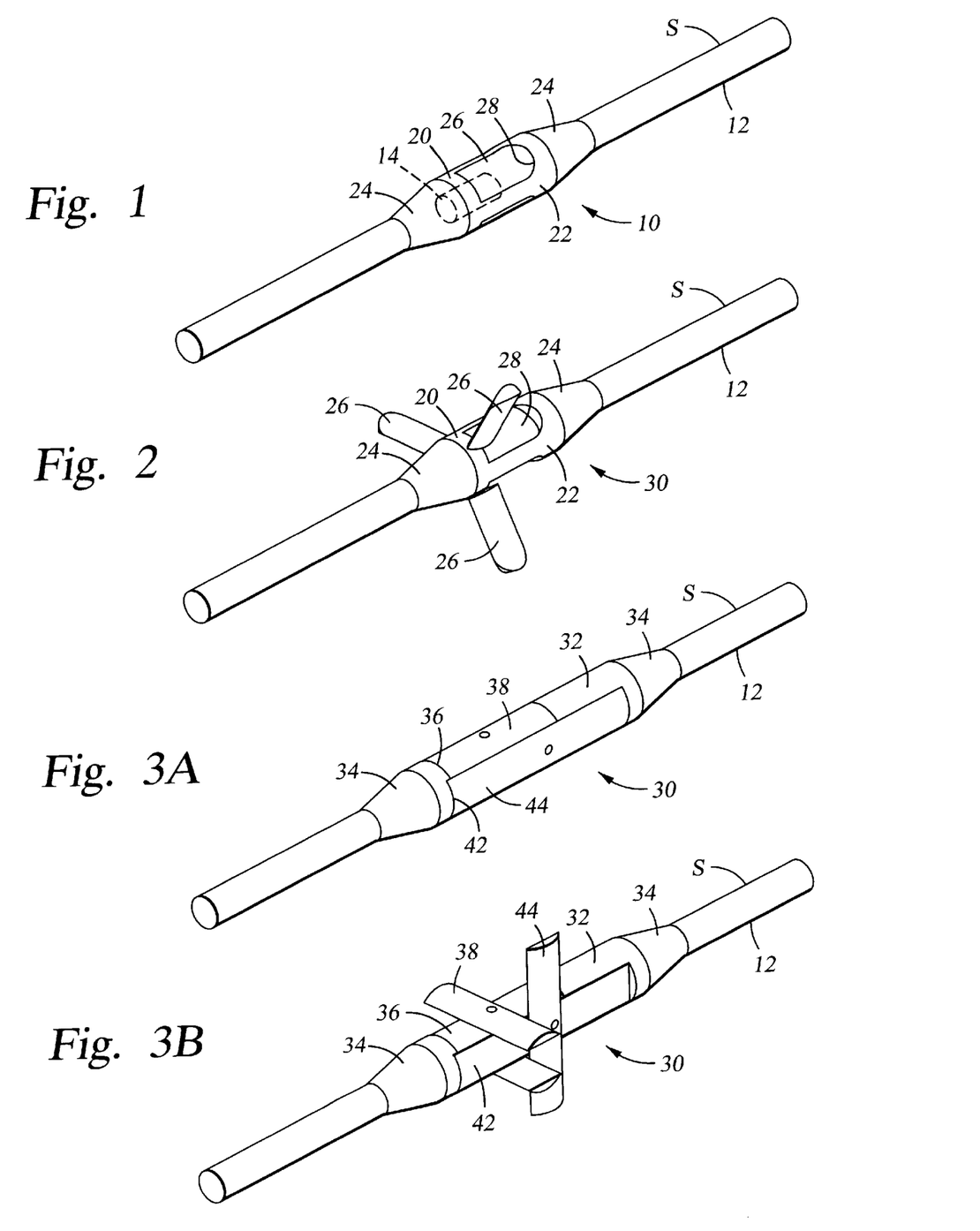
FIG. 1 is a perspective view of a seismic streamer and control module according to the present invention.
FIG. 2 is a perspective view of the seismic streamer of FIG. 1 with control surfaces of the control module extended.
FIG. 3A is a perspective view of a seismic streamer and depth control module according to the present invention.
FIG. 3B shows the streamer of FIG. 3A with wings extended.

Referring now to FIG. 1, a seismic streamer S according to the present invention has a streamer body 12 of any desired length. A depth control module or "bird" 10 with a body 22 is secured on the body 12 of the seismic streamer S. Ends 24 of the body 22 are, preferably, faired or tapered to form a streamlined profile for a control module 20. One or both ends may be faired or tapered for smooth hydrodynamic flow.

A plurality of control surfaces or wings 26 are initially disposed in recesses 28, as shown in FIG. 1, so that they are flush with the exterior surface of the body 22.

The wings 26 are movable out from the recesses 28 by control and power apparatus 14 (shown schematically in FIG. 1) within the body 22. Once extended, the wings 26 are also rotatable to adjust their attitude with respect to the body 22. The control apparatus may be physically linked to a tow vessel's on-board controls or it may be controlled remotely from the tow vessel.

FIGS. 3A and 3B show a bird 30 according to the present invention on a streamer S with a body 32; faired ends 34; wing recesses 36 for wings 38; and wing recess 42 for wing 44. The wings 38 and 44 are movable as are the wings 26 (FIG. 1) and have similar control and power apparatus.

Figure 4A:
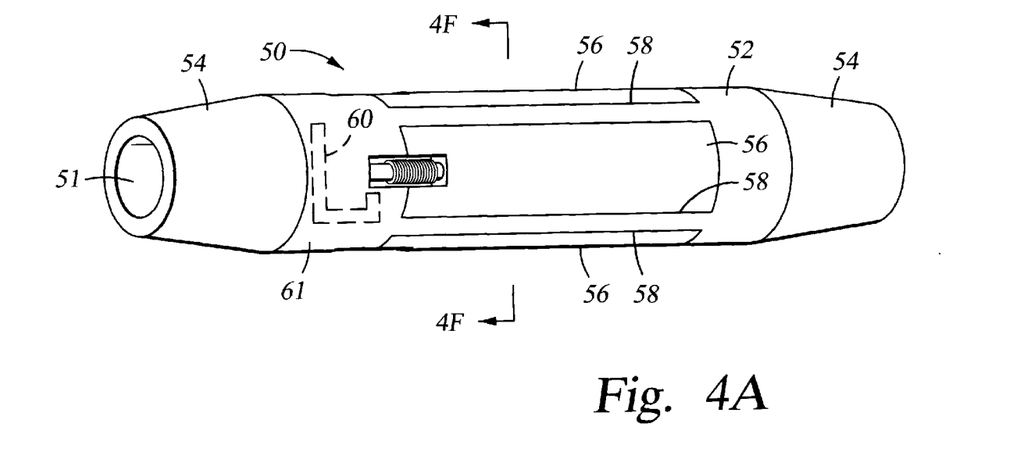
FIG. 4A is a perspective view of a seismic streamer and depth control module according to the present invention.
Figure 4B:
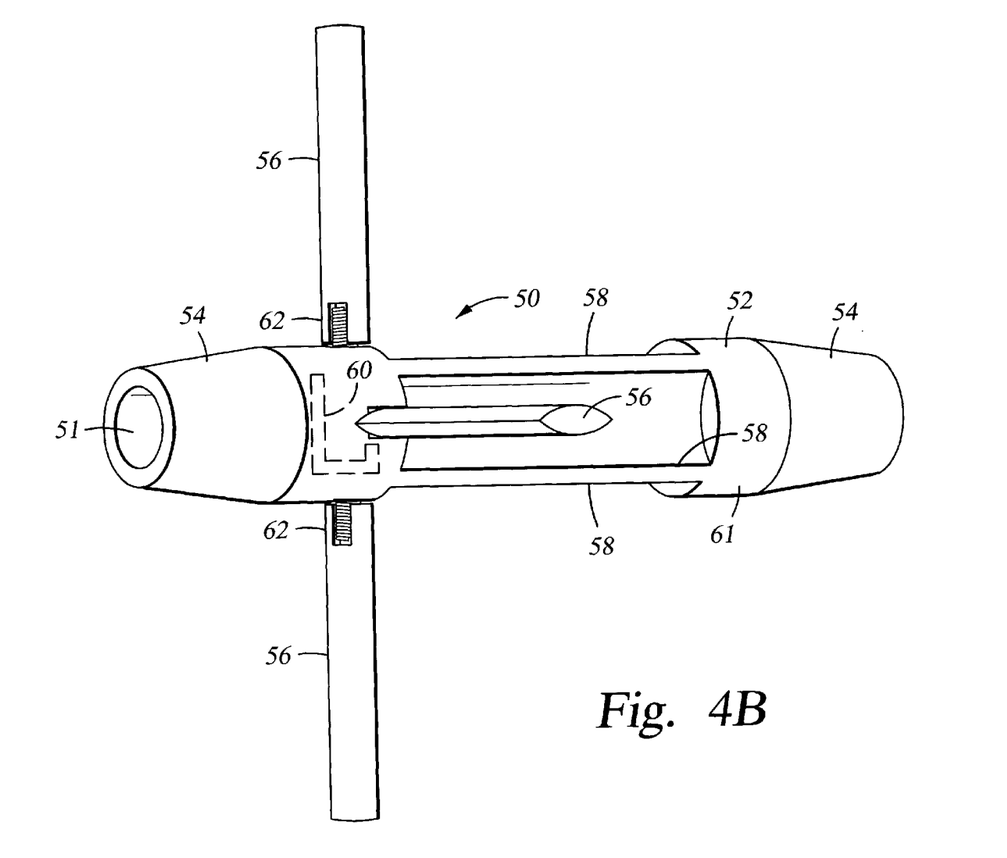
FIG. 4B shows the streamer of FIG. 4A with wings extended.

FIG. 4A shows a seismic streamer bird SO according to the present invention with a body 52 having tapered ends 54 and four wing recesses 58 in which are disposed movable wings 56. Each wing is independently movable by control apparatus 60 (shown schematically) enclosed in a waterproof enclosure 61 (see FIG. 4F). FIG. 4B shows the wings 56 extended and rotated. The body is emplaceable on a seismic streamer extending through a central channel 51.

Figure 4C:
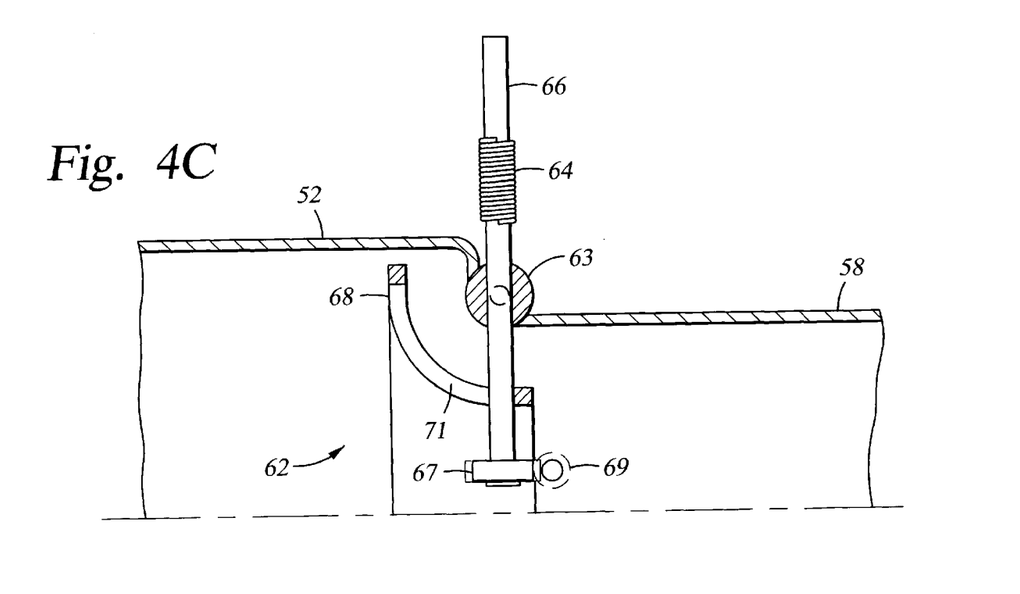
FIG. 4C, FIG. 4D, and FIG. 4E are side cross-section views of a wing apparatus of the streamer of FIG. 4A.
Figure 4D:
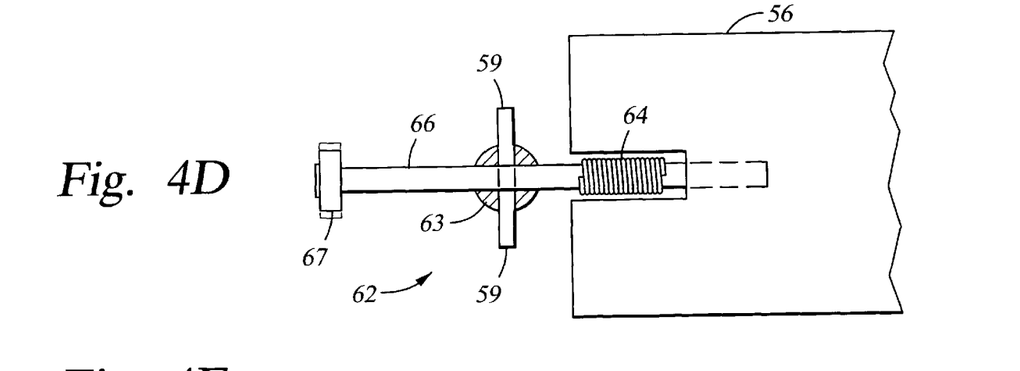
Figure 4E:
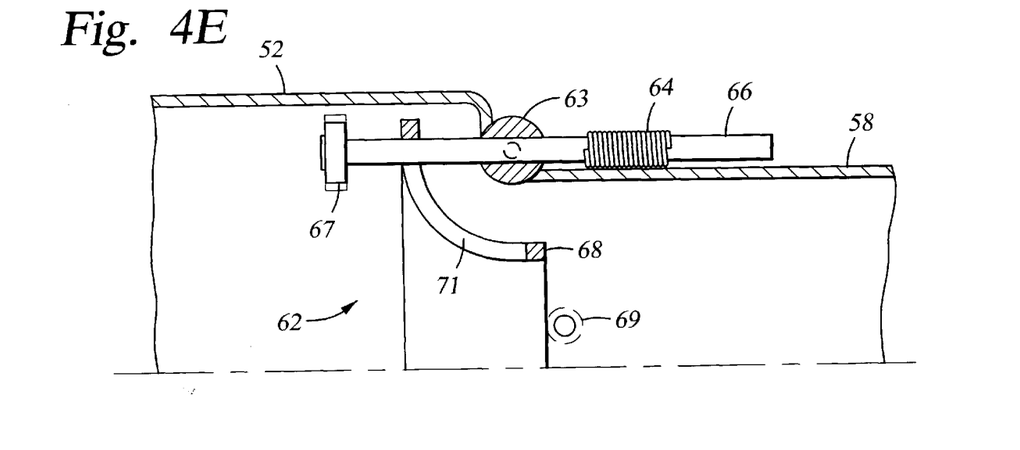
Figures 4F, 5:
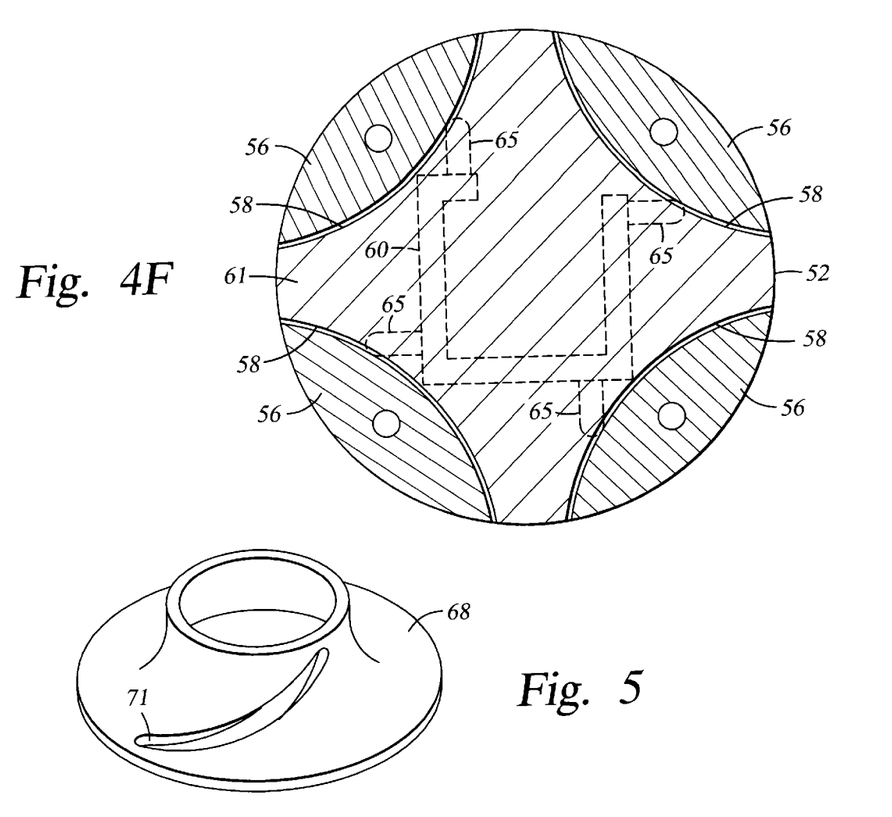
FIG. 4F is a cross-section view along line 4F—4F of FIG. 4A.
FIG. 5 is a perspective view of a flange used with the streamer of FIG. 4A.

FIGS. 4C–4E illustrate a wing mount 62 as used with each wing 56. The wing mounts 62 include a flexible/breakaway joint 64 (e.g. but not limited to a spring member whose tensile strength is known and which will break in response to a known force on the wing). The joint 64 is part of a shaft 66 that has one end secured to the wing 56 and the other end secured to a gear 67. At an intermediate point the shaft 66 rotatably extends through a waterproof ball and socket joint 63 that is itself rotatably secured by pins 59 to the body 52 of the streamer 50.

FIG. 4E shows the position of the shaft 66 when a wing is housed in its recess 58. FIG. 4C shows the position of the shaft 66 when a wing is extended as in FIG. 4B. As shown in FIG. 4C a gear 67 on a lower end of the shaft 66 is turned by a corresponding worm gear 69 which is interconnected with the control apparatus 60. Turning of the worm gear 69 adjusts the attitude of the wing 56 connected to the shaft 66. Each shaft 66 has its own corresponding worm gear and is interconnected with the control apparatus. A flange 68 is rotatably fixed inside the bird body 52. Slots 71 (one for each of four wing shafts 66) are cut through the flange 68. An interior portion of the shafts 66 between the gear 67 and the socket joint 63 passes through the flange 68 in the slot 71. When the flange 68 is rotated by the control apparatus 60 about an axis coincident with an axis of the streamer module, the shaft 66 rotates about an axis defined by the pins 59. Thus, the wings 56 may rotate through a 90° arc (as in FIGS. 4C, 4E) to deploy and retract. When the flange 68 is rotated to its maximum extent, the shaft 66 is locked into position by interior side walls of slots 71. A sensor 65 interconnected with the control apparatus 60 and each wing senses the wing angle and transmits a signal indicative thereof to the control apparatus 60. The control apparatus 60 is in communication with a streamer-position-module controller which, in one aspect, is located within the bird 50 and in communication with a remote control apparatus; and, in another aspect, is located on the tow vessel and is in communication with the apparatus 60.

Figure 7:
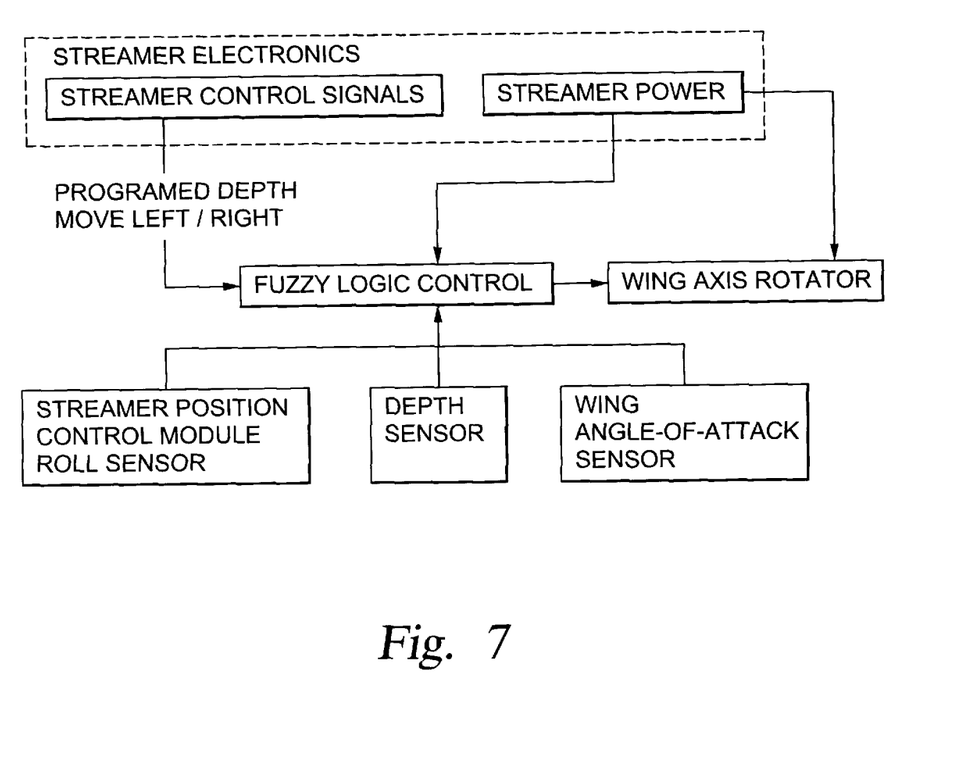
FIG. 7 presents schematically a signal flow diagram for a seismic streamer system according to the present invention.

FIG. 7 illustrates a signal flow diagram for the streamer-position-control-module. This module computes an angle-of-attack for each wing. In one aspect a rotationally balanced force is produced on the streamer to achieve desired vertical or horizontal streamer movement. The dotted line in FIG. 7 indicates a subset of streamer components. A computer assisted navigator apparatus (or a human operator) generates "STREAMER CONTROL SIGNALS" (e.g. depth setting, movement right or left). These signals are sent via the streamer to the bird's control apparatus ("FUZZY LOGIC CONTROL"). The "STREAMER POWER" apparatus provides electric power for on-streamer electronics and for wing rotation. A ROLL SENSOR senses streamer roll and sends signals indicative thereof to the control apparatus. A DEPTH SENSOR senses streamer depth and sends signals indicative thereof to the control apparatus. A WING ANGLE OF ATTACK SENSOR senses wing attitude and sends signals indicative thereof to the control apparatus.

Figure 6A:
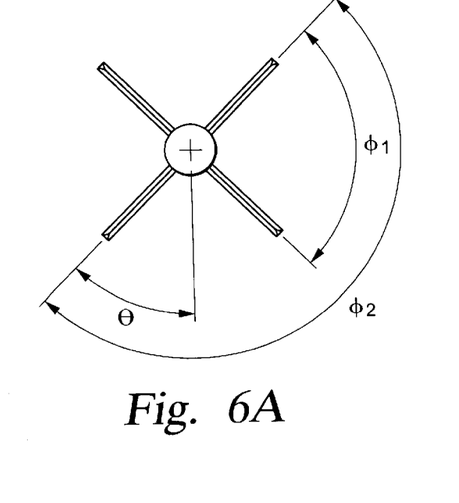
FIG. 6A presents schematically a position for the streamer of FIG. 4A.
Figure 6B:
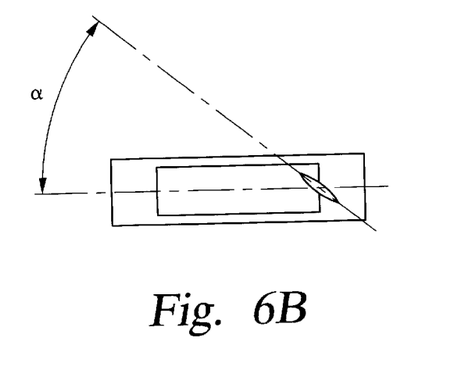
FIG. 6B presents schematically a position for the streamer of FIG. 4A.

A conceptual model of a bird with an even number of control surfaces uniformly disposed about the bird and attached to a streamer is shown in FIGS. 6A and 6B. The dotted line arrow in FIG. 6A indicates a gravity vector. To effect a vertical change in position, a net vertical force is produced by independently adjusting the angle of attack of each wing using the following mathematical relationship:

$$\alpha_{nv} = \alpha_v \sin(\Phi_n + \theta)$$

Where n is the control surface identification and $\alpha_v$ represents the nominal angle-of-attack for a hypothetical control surface with area $A_H$ oriented in the horizontal plane having a wing area equal to ½ of the sum of actual control surfaces.

$$A = \sum_1^n A_n$$

(where $A_n$ is the area of each wing)

The resulting hydrodynamic force is balanced about a vertical line passing through the centerline of the bird. The thrust produced by wings on each side of the vertical produce force vectors parallel to the vertical plane and equal in magnitude.

Similarly, to produce a lateral change in position, a net horizontal force is produced by independently adjusting the angle-of-attack of each wing using the following relationship:

$$\alpha_{nl} = \alpha_l \cos(\Phi_n + \theta)$$

To effect a change in the vertical and horizontal position, the sum of computed angles will produce a net force balanced about a plane inclined to the vertical and thus will not produce a rotational force on the streamer.

$$\alpha_n = \alpha_{nv} + \alpha_{nl}$$

In certain embodiments, a change in vertical position is easily automated with a depth sensor providing input to the on-board microprocessor. The desired streamer depth may be dynamically set by a human or by a computer controller on the tow vessel. A depth command is communicated to the bird controller by electrical or optical signals carried on conductors built into the streamer. The vertical position may be defined to achieve a particular depth suitable for seismic data acquisition or may be set to protect the streamer from collision with surface or subsurface obstructions. The bird controller sets wing angle to move the streamer toward the desired depth. As the streamer approaches the programmed depth, wing angles are decreased so that the streamer does not overshoot the programmed depth and thus risk undamped oscillation about the programmed depth. A change in lateral position requires input from a position measurement system (in one aspect on board a tow vessel) which may receive input from GPS, acoustic, or inertial navigation components.

For a bird with an odd number of wings, the mathematical formulas and computations are similar to those discussed above for a bird with an even number of wings.

The present invention, therefore, in certain embodiments, provides a bird for a seismic streamer for controlling position of the seismic streamer, the bird having a body with a first end and a second end and a bore therethrough from the first end to the second end for receiving a seismic streamer therethrough, one or a plurality of wings, each wing movably connected to a shaft connected to the body, a recess in the body for each wing, the wing or wings movably connected to the shafts for movement from and into the recesses, and the shafts rotatable with respect to the body, and control apparatus interconnected with the shafts for controlling wing movement to and from the recesses and for controlling wing attitudel; such a bird wherein the first end of the body and the second end of the body are tapered ends; any such bird with control apparatus within the body interconnected with the at least one wing for controlling movement of the at least one wing; any such bird with power apparatus for moving the at least one wing, the power apparatus controlled by the control apparatus; any such bird with flexible mount apparatus for mounting each wing to the body; any such bird with breakaway mount apparatus for mounting each wing to the body; any such bird wherein the at least one wing is a plurality of wings; any such bird wherein the plurality of wings includes at least one first wing movable to a first position and at least one second wing movable to a second position; any such bird wherein the first and second wings are parallel with respect to, at an angle to, or are perpendicular to each other following movement from their respective recesses; any such bird wherein each wing of the plurality of wings is interconnected with a sensor that senses attitude of the wing and transmits a signal to control apparatus in the body indicative of wing attitude, the control apparatus including a mechanism for adjusting the attitude of each wing.

The present invention, therefore, in certain embodiments, provides a bird for a seismic streamer for controlling position of the seismic streamer, the bird having a body with a first end and a second end and a bore therethrough from the first end to the second end for receiving a seismic streamer therethrough, a plurality of wings movably connected to the body with flexible mount apparatus, a plurality of recesses in which is initially disposed one of the wings, each wing movably connected to the body for movement from and into a recess and for attitude adjusting movement with respect to the body when the wing is outside the recess, control apparatus within the body interconnected with each wing for controlling movement of each wing, power apparatus for moving each wing, the power apparatus controlled by the control apparatus, and each wing of the plurality of wings interconnected with a sensor that senses attitude of the wing and transmits a signal to the control apparatus indicative of wing attitude, the control apparatus including a mechanism for adjusting the attitude of each wing.

The present invention, therefore, provides in certain embodiments, a seismic streamer system with one or a plurality of seismic streamers each having a streamer body, at least one bird mounted to the streamer body, the bird having a body with a first end and a second end and a bore therethrough from the first end to the second end for receiving the seismic streamer therethrough, at least one wing movably connected to the body, at least one recess in which is initially disposed the at least one wing, the at least one wing movably connected to the body for movement from and into the at least one recess and for attitude adjusting movement with respect to the body when the at least one wing is outside its recess; such a seismic streamer system wherein the at least one wing is a plurality of wings and the at least one bird has control apparatus within the body interconnected with each wing for controlling movement of each wing, power apparatus for moving each wing, the power apparatus controlled by the control apparatus, and flexible mount apparatus for mounting each wing to the body; any such seismic streamer system wherein the at least one bird is a plurality of spaced-apart birds; and any such seismic streamer system wherein the at least one bird has a plurality of wings including at least one first wing movable to a first position and at least one second wing movable to a second position.

The present invention, therefore, provides in at least certain embodiments, a method for controlling a seismic streamer, the method including moving the seismic streamer through water, the seismic streamer having secured thereto at least one bird, the at least one bird having a body with a first end and a second end and a bore therethrough from the first end to the second end for receiving a seismic streamer therethrough, at least one wing movably connected to the body, at least one recess in which is initially disposed the at least one wing, the at least one wing movably connected to the body for movement from and into the at least one recess and for attitude adjusting movement with respect to the body when the at least one wing is outside its recess, and activating the at least one wing of the at least one bird to control position of the seismic streamer; such a method wherein the at least one bird has control apparatus within the body interconnected with the at least one wing for controlling movement of the at least one wing, power apparatus within the body, adjacent thereto, or remote therefrom and interconnected therewith for power transmission thereto, for moving the at least one wing, the power apparatus controlled by the control apparatus, the at least one wing is a plurality of wings including at least one first wing movable to a first position and at least one second wing movable to a second position; and such a method wherein the first and second wings are at an angle to, parallel to, or perpendicular to each other following movement from their respective recesses.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A bird for a seismic streamer for controlling position of the seismic streamer, the bird comprising a body with a first end and a second end and a bore therethrough from the first end to the second end for receiving a seismic streamer therethrough, a plurality of wings, each wing movably connected to a shaft connected to the body, a recess in the body for each wing, the wings movably connected to the shafts for movement from and into the recesses, and the shafts rotatable with respect to the body, and control apparatus interconnected with the shafts for controlling wing movement to and from the recesses and for controlling wing attitude.

2. The bird of claim 1 further comprising the first end of the body comprising a tapered end, and the second end of the body comprising a tapered end.

3. The bird of claim 1 further comprising control apparatus within the body interconnected with the at least one wing for controlling movement of the at least one wing.

4. The bird of claim 3 further comprising power apparatus for moving the at least one wing, the power apparatus controlled by the control apparatus.

5. The bird of claim 1 further comprising flexible mount apparatus for mounting each wing to the body.

6. The bird of claim 1 further comprising breakaway mount apparatus for mounting each wing to the body.

7. The bird of claim 1 wherein the at least one wing is a plurality of wings.

8. The bird of claim 7 wherein the plurality of wings includes at least one first wing movable to a first position and at least one second wing movable to a second position.

9. The bird of claim 8 wherein the first and second wings are parallel with respect to each other following movement from their respective recesses.

10. The bird of claim 8 wherein the first and second wings are at an angle to each other following movement from their respective recesses.

11. The bird of claim 10 wherein the first and second wings are perpendicular to each other following movement from their respective recesses.

12. The bird of claim 7 wherein each wing of the plurality of wings is interconnected with a sensor that senses attitude of the wing and transmits a signal to control apparatus in the body indicative of wing attitude, the control apparatus including a mechanism for adjusting the attitude of each wing.

13. A bird for a seismic streamer for controlling position of the seismic streamer, the bird comprising a body with a first end and a second end and a bore therethrough from the first end to the second end for receiving a seismic streamer therethrough, a plurality of wings movably connected to the body with flexible mount apparatus, a plurality of recesses in which is initially disposed one of the wings, each wing movably connected to the body for movement from and into a recess and for attitude adjusting movement with respect to the body when the wing is outside the recess, control apparatus within the body interconnected with each wing for controlling movement of each wing, power apparatus for moving each wing, the power apparatus controlled by the control apparatus, and each wing of the plurality of wings interconnected with a sensor that senses attitude of the wing and transmits a signal to the control apparatus indicative of wing attitude, the control apparatus including a mechanism for adjusting the attitude of each wing.

14. A seismic streamer system comprising a seismic streamer having a streamer body, at least one bird mounted to the streamer body, the bird comprising a body with a first end and a second end and a bore therethrough from the first end to the second end for receiving the seismic streamer therethrough, at least one wing movably connected to the body, at least one recess in which is initially disposed the at least one wing, the at least one wing movably connected to the body for movement from and into the at least one recess and for attitude adjusting movement with respect to the body when the at least one wing is outside its recess.

15. The seismic streamer system of claim 14 wherein the at least one wing is a plurality of wings and the at least one bird further comprising control apparatus within the body interconnected with each wing for controlling movement of each wing, power apparatus for moving each wing, the power apparatus controlled by the control apparatus, and flexible mount apparatus for mounting each wing to the body.

16. The seismic streamer system of claim 14 wherein the at least one bird is a plurality of spaced-apart birds.

17. The seismic streamer system of claim 15, the at least one bird further comprising the plurality of wings includes at least one first wing movable to a first position and at least one second wing movable to a second position.

18. A method for controlling a seismic streamer, the method comprising moving the seismic streamer through water, the seismic streamer having secured thereto at least one bird, the at least one bird comprising a body with a first end and a second end and a bore therethrough from the first end to the second end for receiving a seismic streamer therethrough, at least one wing movably connected to the body, at least one recess in which is initially disposed the at least one wing, the at least one wing movably connected to the body for movement from and into the at least one recess and for attitude adjusting movement with respect to the body when the at least one wing is outside its recess, and activating the at least one wing of the at least one bird to control position of the seismic streamer.

19. The method of claim 18 wherein the at least one bird further comprises control apparatus within the body interconnected with the at least one wing for controlling movement of the at least one wing, power apparatus for moving the at least one wing, the power apparatus controlled by the control apparatus, the at least one wing is a plurality of wings including at least one first wing movable to a first position and at least one second wing movable to a second position.

20. The method of claim 19 wherein the first and second wings are at an angle to each other following movement from their respective recesses.

\* \* \* \* \*

UNITED STATES PATENT AND TRADEMARK OFFICE
CERTIFICATE OF CORRECTION

PATENT NO. : 6,011,752
DATED : Jan. 4, 2000
INVENTOR(S) : Loran D. Ambs; Ronald E. Chambers It is certified that error appears in the above-indentified patent and that said Letters Patent is hereby corrected as shown below:

In Column 3, Line 9, last word, change " swings " to:

-- wings --

In Column 3, Line 25, first word, change "owing " to:

-- wing --

In Column 5, Line 31, eighth word, change " SO " to:

-- 50 --

Signed and Sealed this

Seventh Day of November, 2000

*Attest:*

Q. TODD DICKINSON

*Attesting Officer*       *Director of Patents and Trademarks*